United States Patent
Kleiner

(10) Patent No.: US 6,979,157 B2
(45) Date of Patent: Dec. 27, 2005

(54) HEAVY-DUTY COUPLING FOR TOOL HOLDER ARMS OF MODULAR DESIGN

(75) Inventor: Gilbert Kleiner, Sigmaringen-Laiz (DE)

(73) Assignee: Jorg Guhring, Albstadt (DE)

( * ) Notice: Subject to any disclaimer, the term of this patent is extended or adjusted under 35 U.S.C. 154(b) by 4 days.

(21) Appl. No.: 10/365,461

(22) Filed: Feb. 13, 2003

(65) Prior Publication Data

US 2004/0037633 A1    Feb. 26, 2004

(30) Foreign Application Priority Data

Feb. 14, 2002 (DE) ................. 102 06 168

(51) Int. Cl.$^7$ ............................... B23C 5/26
(52) U.S. Cl. .................. 409/234; 409/232; 279/102
(58) Field of Search .................... 409/234, 232, 409/233, 136; 29/446–447, 525; 279/102–103; 403/311; 408/239 R, 239 A

(56) References Cited

U.S. PATENT DOCUMENTS

| | | | | |
|---|---|---|---|---|
| 3,699,843 A | * | 10/1972 | Sweeny | 409/234 |
| 3,759,536 A | * | 9/1973 | Bronzini | 279/103 |
| 4,604,010 A | * | 8/1986 | Reeves | 409/233 |
| 4,748,879 A | * | 6/1988 | von Haas | 409/234 |
| 4,834,597 A | * | 5/1989 | Andersson et al. | 409/234 |
| 5,352,073 A | * | 10/1994 | Kitaguchi | 409/232 |
| 5,407,308 A | * | 4/1995 | Takayoshi | 409/232 |
| 5,468,102 A | * | 11/1995 | Stojanovski | 409/234 |
| 5,690,137 A | * | 11/1997 | Yamada | 409/136 |
| 5,775,857 A | * | 7/1998 | Johne | 409/234 |
| 6,083,146 A | * | 7/2000 | Earley, Jr. | 409/234 |
| 6,599,068 B1 | * | 7/2003 | Miyazawa | 409/234 |
| 2001/0041106 A1 | * | 11/2001 | Nagaya et al. | 279/102 |

FOREIGN PATENT DOCUMENTS

| | | |
|---|---|---|
| DE | 742 877 | 12/1943 |
| DE | 38 20 189 | 9/1989 |
| DE | 93 11 531 | 1/1994 |
| DE | 197 24 654 | 12/1997 |
| DE | 196 46 862 | 5/1998 |
| EP | 0 794 337 | 9/1997 |

OTHER PUBLICATIONS

DIN 69063-1:1996-01, May 2003, pp. 1-14.
DIN 69893-1, May 2003, pp. 1-8.

* cited by examiner

*Primary Examiner*—Erica Cadugan
(74) *Attorney, Agent, or Firm*—Oblon, Spivak, McClelland, Maier & Neustadt, P.C.

(57) ABSTRACT

A coupling (10; 100; 200; 400) for use between the modules of a modular tool holder arm, in particular a machine tool, with a male coupling part (12; 112; 212; 412), forming the end of a first module and containing a central, axially symmetrical journal (14; 114; 214; 414), and a female coupling part (20; 120; 220; 320; 420), forming the end of a second module connected to the first module and containing a central, axially symmetrical seat (18; 118; 218; 318; 418). In the engaged state, the two coupling parts form a shaft-hub seat (14, 18; 114, 118; 214, 218; 414, 418) as a first transmission location and at least one other transmission location. At least under load, a first stress field (26) develops in the first transmission location, and another stress field (27, 28) develops in the at least one other transmission location, wherein separation (24, 25; 124, 125; 224; 324; 424) of the first transmission location from the at least one other transmission location is provided, so that the respective stress field (26, 27, 28) is formed without being impacted by the respective other transmission location(s).

13 Claims, 15 Drawing Sheets

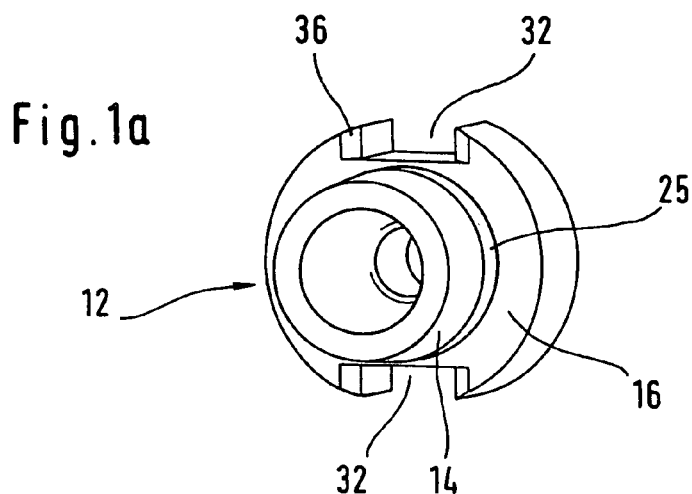
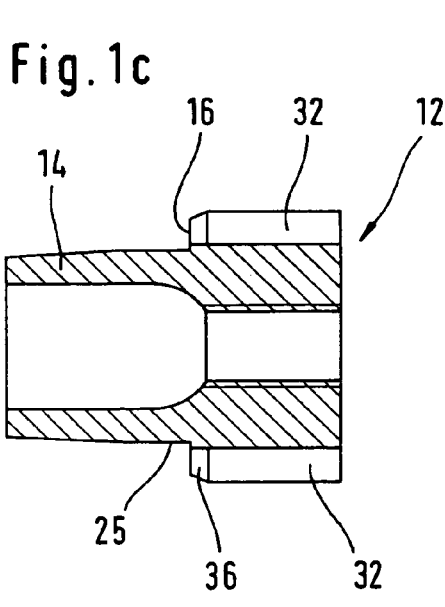
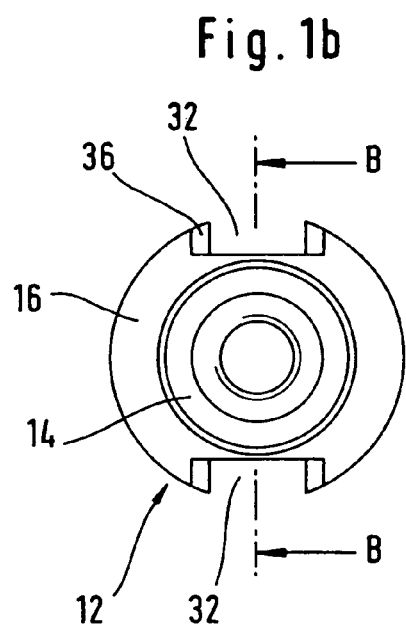
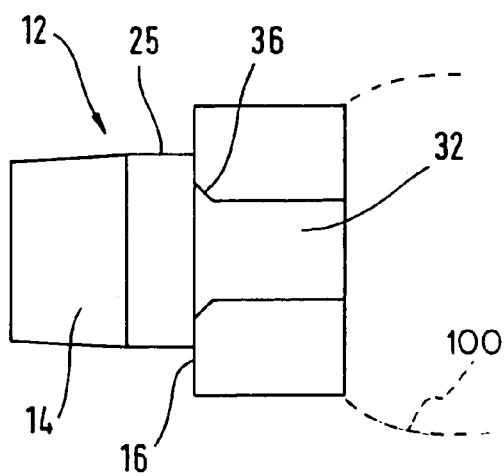

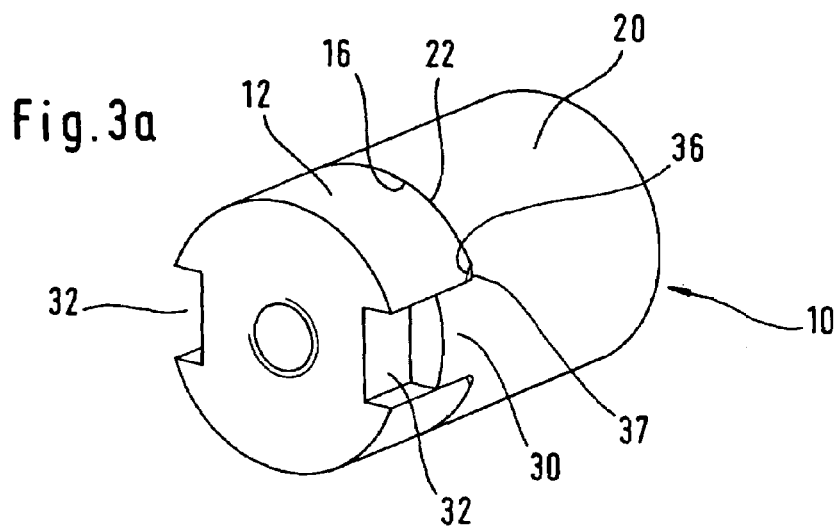
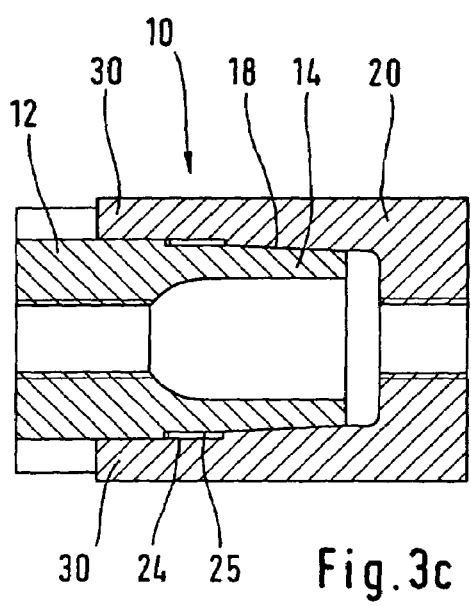
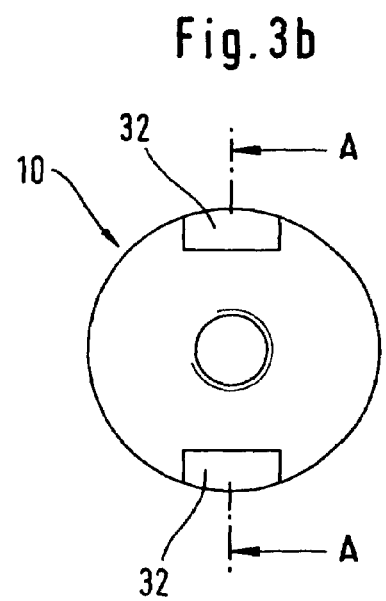
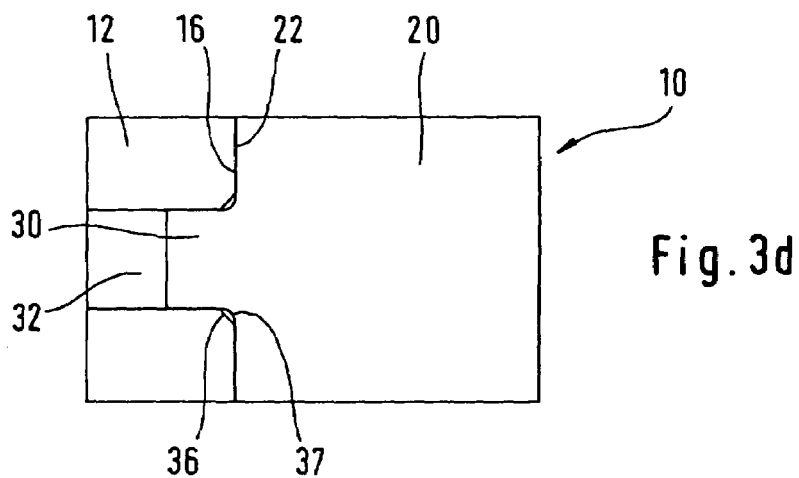

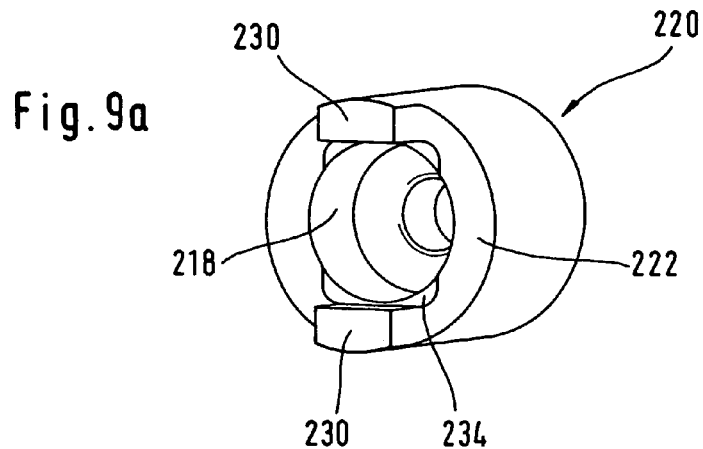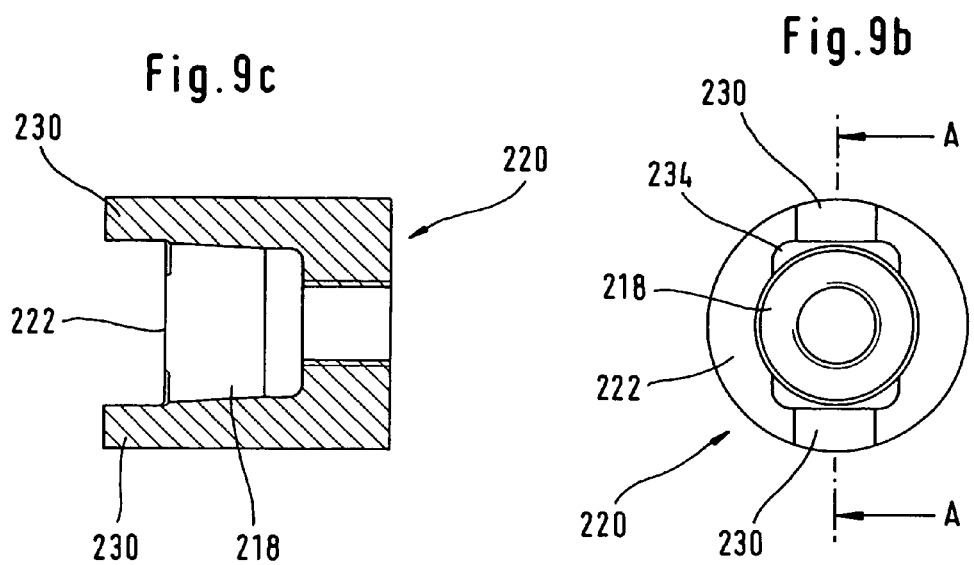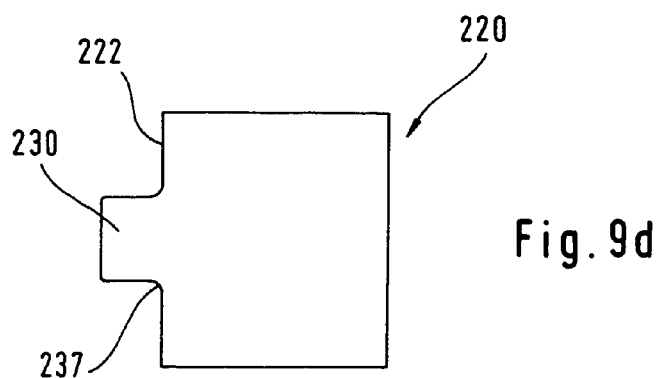

HEAVY-DUTY COUPLING FOR TOOL HOLDER ARMS OF MODULAR DESIGN

BACKGROUND OF THE INVENTION

The present application is based on German Patent Application DE 10206168.8, filed on Feb. 14, 2002, the contents of which are hereby incorporated herein by reference in their entirety.

1. Field of the Invention

The invention concerns a coupling, specifically a heavy-duty coupling, for tool holder arms of modular design, a tool holder arm with the inventive coupling, and the individual arm modules, specifically an insert tool holder, an extension, and a basic adapter, as well as a machine tool with interface.

2. Description of the Related Art

The tool holder arms of modern machine tools are generally of modular design to ensure easy configuration and reduced set-up times for economical operation. Such a tool holder arm may consist of the following individual modules: tool holder or insert tool holder head (e.g., drill chucks, milling cutter holders, collet chucks, bore heads, etc.), extension or adapter (e.g., drill rods, HSK basic shanks, drill chuck holders, arbors, etc.) and a basic adapter (ISO adapters, VDI holders, reduction sleeves, etc.). With conventional couplings, power transmission is usually performed in a frictionally engaged manner through a press-fit shaft-hub seat formed by a central journal and socket (steep cone systems, HSK systems, shrink chucks), form fitting via radial off-center drive keys meshing into the counter-piece recesses, or form fitting and tensionally locked via central journal and sockets with a profile, e.g., a polygonal profile.

Couplings with inserted drive rings are also used, containing drive keys and central journals on both sides and connecting two corresponding coupling parts or hollow shaft cone systems (VDI holders) with drive keys in addition to a cone shaft-hub seat.

Strong axial forces and high torque occur in existing manufacturing methods, such as exchangeable disk drill systems, particularly double- or multiple-cutting systems (e.g. Gühring LT 800 WP), high-speed cutting or dry cutting, where high revolution and feed with large tool diameters are used. Therefore, stress-resisting couplings meeting high stability and torsion rigidity requirements are necessary between the individual modules. Conventional couplings occasionally reach their limit during these processes.

SUMMARY OF THE INVENTION

Therefore, an object of the present invention is to find a solution to the problem of designing a coupling for modular tool holder arms, and a tool holder arm with the inventive coupling, and the individual arm modules, particularly an insert tool holder, an extension or adapter piece, and a corresponding basic adapter.

It is a further object of this invention to develop a machine tool with an interface that is optimized for the above-described requirements, as well as simply structured and costeffective.

According to a feature of the invention, the above and other objects are addressed by a coupling comprising a male coupling part with a central journal, and a female coupling part with a central socket, each forming the border of a tool arm module, e.g., an insert tool holder piece and basic adapter. When inserted, the two coupling parts form the first power transmission location, namely a press-fit shaft-hub seat, at least in transition fit, where power transmission takes place in a form-fitting, or form-fitting and tensionally locked manner. The coupling contains at least one additional transmission location, increasing the coupling's overall transmitted power.

However, power transmission in these locations leads to stress fields in the material of the coupling parts. Depending on type and extent of the transmission locations, these stress fields show different directions, strengths and positions and have different expansion or compression impacts, which may influence the transmission capability of the other transmission locations. A special design of one transmission location may also affect transmission capability of the other transmission locations, e.g., notch impact. Problems in the transmission process may occur if stress fields at individual transmission locations are affected by other transmission locations. Stress fields in discrete areas adjacent to the outer circumference may, for example, cause radial deformation reducing the true run of the shaft-hub seat, which leads to reduced power transmission capability of the shaft-hub seat.

According to this invention, separating at least two transmission locations prevents stress superposition. Different stress components will not add up to a stress total that exceeds material stress tolerance—at least not in the long run (premature material fatigue)—and mutual disturbance of at least two stress fields are effectively eliminated. This applies in particular to deformations caused by stress fields, i.e. expansions/compressions. Negative impact at one transmission location through the design of another is also prevented. All in all, optimal and undisturbed power transmission is achieved for at least two transmission locations (shaft-hub seat and other transmission locations), and true run of the entire tool holder arm will improve.

Although various shaft-hub seat designs are acceptable (e.g., a cylindrical force fit with the tool holder head shrunk into the chuck), a cone design shaft-hub seat is still most advantageous, as it has proven useful for conventional couplings, due to high friction values. In particular, a connection design based on HSK system specifications (DIN 69893) enables application of the inventive coupling to conventional standard systems.

Such hollow-cone systems display high pre-stress, e.g., by pre-stressing the two inserted coupling parts by means of a differential screw. Conical expansion from the force fit on the cone/hollow cone shaft will, according to the invention, not be affected by the at least one additional transmission location; therefore, conical expansion will occur evenly over the entire circumference. On the other hand, conical expansion will not affect power transmission in the other transmission locations either, as it does not superimpose the stress field of the other transmission locations, resulting in locally limited effects.

In another embodiment, the coupling shows a polygonal shaft-hub seat. Such a shaft-hub seat profile design allows picking up loads through friction fit as well as friction-lock connection, i.e., overall a higher load than solely through friction fit. Since this profile leads to high stress concentration levels at the rounded corners of the polygon, separating the stress fields is particularly effective in this case.

According to the invention, the coupling will be placed between the tool holder arm modules, e.g., between a tool insert carrier head or a tool holder, and a corresponding carrier head holder or spindle of the tool holder arm.

The invention also allows positioning of the inventive coupling at the parting point between a basic adapter and an extension piece, or between extension and tool insert carrier head, or between a tool insert in a chuck and the tool holder head, which in this case is designed as a clamping chuck.

In another embodiment, two mated end faces form the second transmission location. By separating the stress field in the first transmission location (shaft-hub seat) from the stress field of the second transmission location (mated surfaces), there will be no warpage of the mated surfaces from possible irregular stress distribution on the circumference of the shaft-hub seat, and no irregular radial deformation at the shaft-hub seat from possible uneven end-face surface contact. Not only will this result in optimal power transmission at the shaft-hub seat and at the butt joint of the mated running end faces, but it will also improve true run of the entire tool holder arm.

In conventional HSK systems with end faces directly adjoining the cone of the shaft-hub seat, pressure on the end faces leads to stress superposition due to the shaft-hub seat and due to the butt joint on the end faces. By contrast, according to the invention, power and power transmission on the end faces increase with increasing total load (and thus with increasing pressure on the end faces) so that increasing torque can be transmitted with increasing total load.

In a shaft-hub seat, for example, one that is designed as a HSK system, with high radial pre-stress, the ability of the connection to transmit torque is limited to a value that remains constant across the entire load spectrum. With the inventive coupling, however, torque transmission can be increased for high loads "on demand."

In this context, it shall also be mentioned that it is possible to produce the inventive coupling for the same stress tolerance with lower tolerance settings and that it will therefore be less expensive than a conventional coupling. By this structure, the inventive coupling is designed for greater load-tolerance.

According to a further feature of the invention, separation of the stress fields is preferably achieved by an axial distance from the shaft-hub seat transmission location to the end face transmission location. However, surfaces of the shaft-hub seat in the area of the end faces can also be pretreated differently from the surfaces of the shaft-hub seat that are remote to the area of the end faces.

According to a further feature of the invention, the distance between shaft-hub seat and mated end faces can be easily realized with a recess of the shaft-hub seat in the area of the end faces. This recess should be a recess in the central socket of the female coupling part. Alternatively, a recess can also be provided on the journal of the male coupling part, which might result in notch stress concentration.

Conventional couplings frequently contain a (HSK) shaft-hub force fit and drive keys, which, on the peripheral side, are screwed on the female coupling component in key ways provided for this purpose. In the engaged state, they mesh with grooves provided for this purpose on the exterior circumference of the male coupling.

This way, torque is transmitted not only frictionally engaged in the cone, but also positively locking on the drive keys. Due to the high level of pre-stress at the conical seat, uneven cone expansion occurs already in the no-load state of the coupling, particularly when excess dimensions are involved: The lesser material thickness at the grooves for the drive keys results in lower material resistance against the expansion; additionally, the sharp-edged shape of the grooves lead to a high notch effect. Stress is therefore not distributed evenly on the circumference, resulting in irregular deformation or cone expansion. Due to the poor mating of the cone surfaces, this true-run disorder of the socket leads to reduced transmission at the clamping cone and thus to a decrease in the frictionally engaged transmittable torque. Under load, i.e., when torsional stress is applied to the drive keys on the exterior periphery, stress peaks are further increased. The stress fields of the transmission locations of shaft-hub seat/drive keys superimpose and the coupling fails prematurely with increasing load.

A further coupling embodiment eliminates the above-described problems by applying the inventive principle (separation of transmission locations), to a coupling with off-center drive keys. Separation of the transmission locations of shaft-hub seat/drive keys causes cone expansion (or radial pre-stress) to occur evenly on the circumference of the clamping cone or the shaft-hub press fit; the drive key way notch effect is eliminated. Stress superposition under load can be prevented.

Previous failures of conventional clamping cone couplings with drive keys due to excessive cone dimensions (frictional engagement) and exterior torsional stress due to the drive keys (positive fit) are thus effectively prevented. Overall, in the case of a clamping cone connection in the area of the cone connection or in the area of the shaft-hub seat, there will be a larger contact area due to even radial deformation, resulting in improved torsion strength.

Separation of the transmission locations of shaft-hub seat/drive keys according to a further feature of the invention should be performed by providing the drive keys single-piece with one of the two coupling parts. This will eliminate the notch effect of conventional couplings (with drive keys) from the grooves that are provided for screwing in the drive keys and their negative impact on the shaft-hub seat stress field and the cone expansion. An additional stress field to the one resulting from cone expansion, namely the stress field due to adjacent exterior load, will no longer affect the area of the cone/shaft-hub seat on the exterior circumference of the socket.

However, under load, a notch effect also occurs on the base of the drive keys, i.e. where the drive keys protrude from the corresponding coupling part, and the stress field of the drive keys superimposes the one of the cone expansion. Therefore, according to a further feature of the invention, the drive keys are arranged axially at a distance from the shaft-hub seat, avoiding negative influence on the transmission at the shaft-hub seat.

Preferably, the drive keys should be placed on the female coupling part and the fitting grooves on the male coupling part, so that a notch effect from the grooves that are provided for receiving the drive keys is eliminated. This results in a complete separation of the transmission locations of shaft-hub seat/drive keys; stress superposition does not take place, and the cone expansion occurs evenly on the circumference and in axial direction. This results in a significant increase in the transmitted torque, as the drive keys experience load only when the maximum friction torque is overcome.

To further maximize the torque transmitted by the coupling, preferably both drive keys and mated end faces are provided besides the clamping cone. The two transmission locations of drive keys/end faces are arranged axially at a distance from the clamping cone, so that cone pre-stress and the resulting cone expansion occur evenly in axial direction, without influence from the stress fields of the drive keys and the end face butt joint.

When axial distance is accomplished with a recess in the socket of the female coupling part, which also contains the drive keys, another performance-increasing effect is achieved: The recesses being the weakest areas of the coupling part, they experience inward tension loading as a reaction to cone expansion on the clamping cone. Consequently, the drive keys are also pulled inward (see FIG. 4b) and easily fit the grooves of the opposite coupling part.

Transmission at the drive keys occurs not only in a positive locking manner on the radial surfaces of the drive keys, but also in a frictionally engaged manner on their interior circumference surfaces. Additionally, coupling rigidity increases advantageously, both in axial and radial directions.

The frictionally engaged power transmission process on the interior circumference surfaces hereby increases on the axial end of the drive keys and decreases towards the socket. The mated surfaces transmission location is thus separated from the transmission location of the frictionally engaged drive keys. This causes only a slight warpage of the end face at the socket. Warpage caused by drive keys comparable to a disk spring on the end face of the female coupling part can thus be effectively suppressed, ensuring true run.

For an even stricter separation of the butt joint transmission location on the mated end faces and positive fit/ frictional engagement on the drive keys, and to reduce notch effect impact on true run of the end face butt joint at the drive key notch root, a recess on the end face on the female coupling part is an additional feasible measure, besides providing smooth material transition. The recess can either be a recess with smooth diameter transition or a face-milled area of the end face on the holder end in the drive key location.

By face milling the area located radially inward from the drive keys, stress peaks are shifted from the plane of the end face into the recess, due to frictional engagement of the drive keys. With accordingly elongated recesses with smooth diameter transitions in the location of the notch roots beneath the radial lateral surfaces of the drive keys, the notch effect is shifted from the plane of the end faces into the recess, due to the positive fit of the drive keys. Thus, axial run of the end faces is further optimized, and stress superposition in the notch roots, which would lead to premature material fatigue, can be prevented.

However, the invention is not limited to the above-described designs, it is particularly possible to use any number of drive keys, and to adjust the coupling parts for counter-pieces designed to domestic and foreign standard. The individual design features of the disclosed embodiments can be randomly combined, as reasonable.

BRIEF DESCRIPTION OF THE DRAWINGS

In the following, preferred embodiments of the invention are explained in more detail and illustrated by schematic drawings, wherein:

FIG. 1a is a frontal perspective of a male coupling part in a preferred embodiment;

FIG. 1b is a front view of the coupling part in FIG. 1a;

FIG. 1c is a lateral cross-sectional view of the coupling part in FIG. 1b, depicted along cross-sectional line B—B;

FIG. 1d is a side view of the coupling part shown in FIGS. 1a, 1b and 1c;

FIG. 2b is a front view of the coupling part in FIG. 2a;

FIG. 3a is a front perspective of two joined coupling parts in preferred embodiments, as shown in FIGS. 1 and 2;

FIG. 3b is a front view of the coupling in FIG. 3a;

FIG. 3c is a lateral cross-sectional view of the coupling in FIG. 3b, depicted along cross-sectional line A—A;

FIG. 3d is a side view of the coupling shown in FIGS. 3a, 3b and 3c;

FIG. 5b is a front view of the coupling part in FIG. 5a;

FIG. 6b is a front view of the coupling part in FIG. 6a;

FIG. 8b is a front view of the coupling part in FIG. 8a;

FIG. 9a is a front perspective of a female coupling part in an embodiment fitting the male coupling part shown in FIG. 8;

FIG. 9b is a front view of the coupling part in FIG. 9a;

FIG. 9c is a cross-sectional side view of the coupling part in FIG. 9b, depicted along cross-sectional line A—A;

FIG. 9d is a side view of the coupling part shown in FIGS. 9a, 9b and 9c;

DETAILED DESCRIPTION OF THE PREFERRED EMBODIMENTS

Figure 2A:
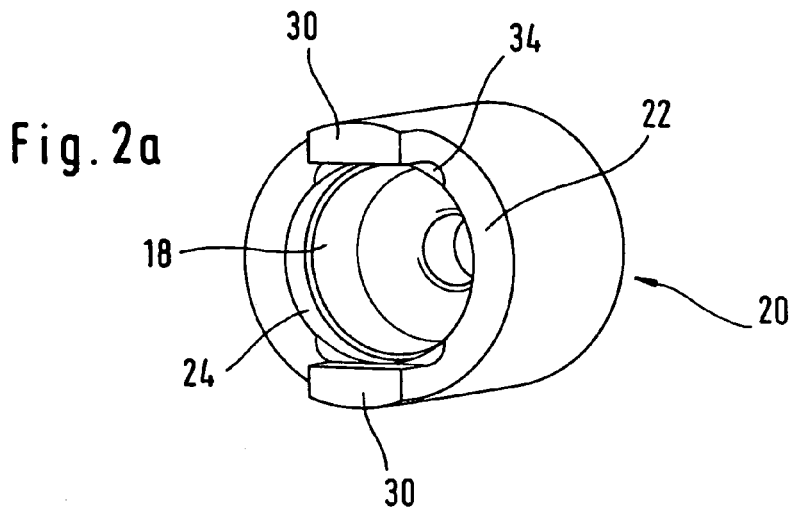
FIG. 2a is a front perspective of a female coupling part in a preferred embodiment.
Figure 2C:
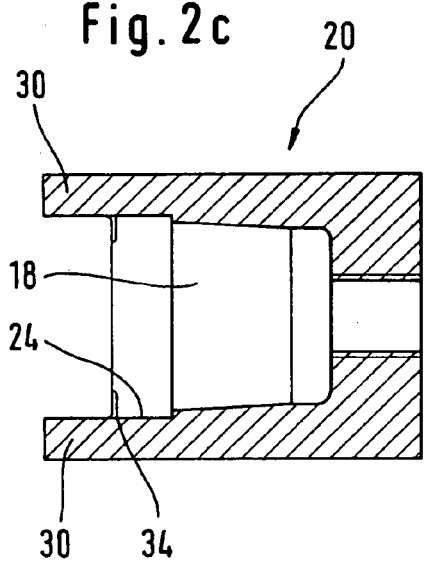
FIG. 2c is a lateral cross-sectional view of the coupling part in FIG. 2b, depicted along cross-sectional line B—B.
Figure 2B:
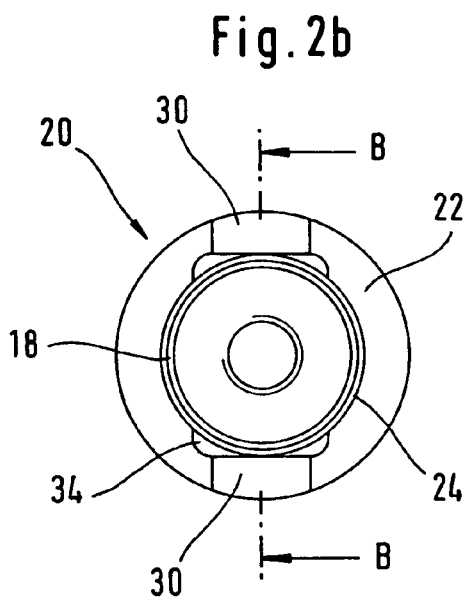
Figure 2D:
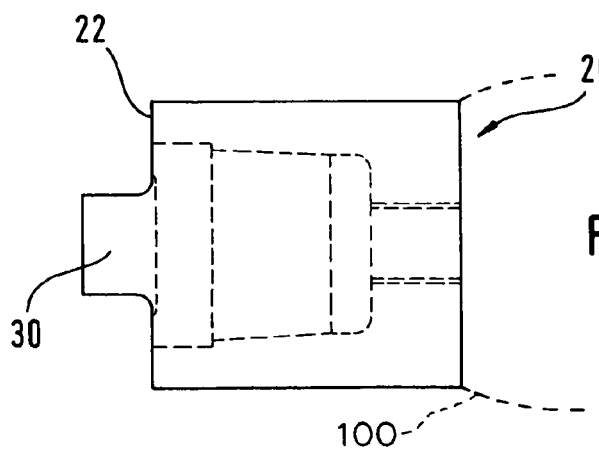
FIG. 2d is a side view of the coupling part shown in FIGS. 2a, 2b and 2c.

First, a preferred embodiment of the invention will be explained with reference to FIGS. 1–3. FIGS. 1a–1d show a male coupling part (12); FIGS. 2a–2d show a female coupling part (20), and FIGS. 3a–3d show the assembled coupling (10) consisting of parts 12 and 20.

The male coupling part (12) has a journal (14), and the female coupling part (20) has a socket (18) for a cone press fit (14, 18). Each of the male coupling part (12) and the female coupling part (20) may be a part of an extension or adapter for a tool holder arm of a machine tool, shown schematically as (100) in the figures. FIGS. 1a–1d show the grooves (32) for the drive keys (30), which in turn are shown in FIGS. 2a–2d. FIGS. 2a–2d also show a taper bore (24), which spaces the interior cone from the end face stop (22) and the drive keys (30). On the opposite side, the recess (25) rests against the male coupling part, distancing the cone (14) from the end face (16) and the drive key ways (32).

As shown in FIG. 3c, cavity (24, 25) separates the transmission location of the cone press fit (14, 18) from the transmission location of the end face butt joint (16, 22) and the transmission location on the drive keys (30), which mesh with the drive key ways (32). A dimension of between 0 to 1 times the nominal coupling diameter has proven to be a suitable value for the cavity (24, 25) between the end faces (16, 22) and the shaft-hub seat (14, 18). For a nominal coupling diameter of .phi.60 mm, for example, a distance value of 14 mm (24, 25) is preferred.

Additionally, the female coupling part contains a milled section (34), which moves the notch root of the drive keys (30) beneath their internal radial surface from the end face plane (22) further into the recess (18). On the radial surfaces of the drive keys (30) a rounded-off material transition area (37) towards the end face (22) is provided (see FIGS. 3a, 3d). On the opposite side, the drive key grooves (32) on the end face (36) contain chamfers (36) (see FIGS. 1, 3a, 3d). These measures not only prevent drive key notch effect (30) in the transmission location of the mated end faces (16, 22), but also form a recess (36, 37) in the support area of the radial side surfaces of the drive keys (30) on the radial side surfaces of the drive key grooves (32). This effects a separation (34, 36, 37) of the transmission locations of drive keys/end faces. On the one hand, the stress field in the internal radial notch root of the drive keys (30) is shifted away from the end face plane (22); on the other hand, the notch effect on the radial lateral notch root is reduced through the rounded-off material transition area. Also, the recess of the drive key seat (30) in the drive key ways (32) in the end face area ensures de-coupling of the transmission locations, so that the occurring stress fields will not (or just slightly) superimpose.

FIGS. 1 through 3 also show a central axial bore by which a differential screw can be guided for pre-stressing the cone press fit.

Extensive FEM-simulation (finite element method) showed that transmission on the end faces (16, 22) and on the drive keys (30) begins to work only gradually on the tool, with increasing overall load. The quantitative simulation results can be viewed in FIG. 4a.

Figure 4A:
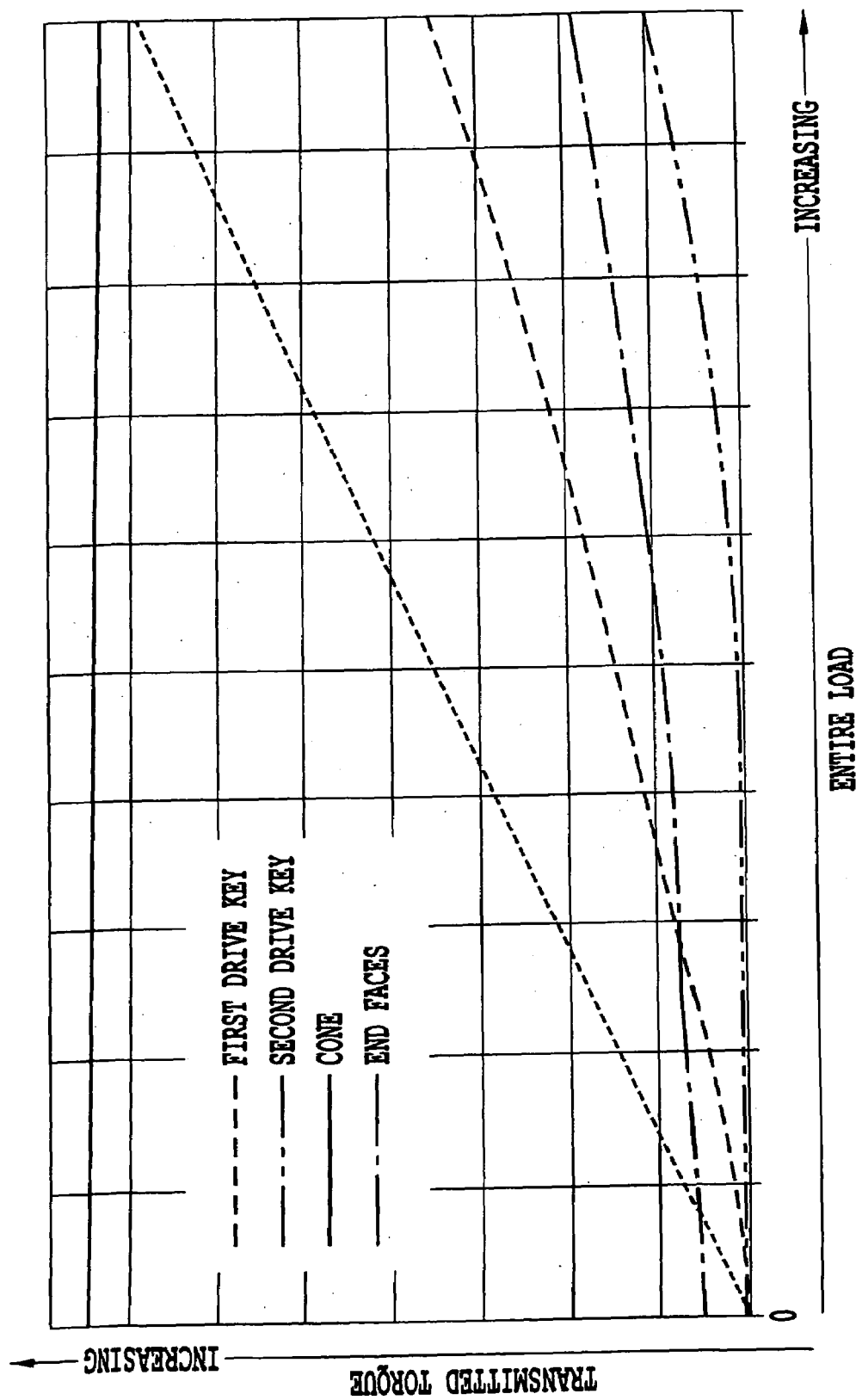
FIG. 4a is a diagram quantitatively representing load distribution in individual transmission locations in a coupling as shown in FIG. 3.

FIG. 4a depicts the distribution of the transmitted torque on the various transmission locations. Torque applied to the end faces (16, 22) has been drawn as a chain line, torque on the first drive key (32) as a line of dashes, and on the second drive key (32) as a line of two short/one long dashes. Torque transmission on the cone (14, 18), which remains constant across the entire load range and corresponds to its pre-stress, has been drawn as a solid line. As a comparative value, torque transmission that can be achieved with one driving element of a conventional drive ring with two driving elements (DIN ring with two driving elements) is represented by a line of short dashes.

The DIN ring of comparable dimensions can only transmit one torsion moment on each drive key. It was found that for transmitting equal overall torque, the DIN ring drive keys experience a disproportionately higher load than the drive keys in the inventive coupling, while torque absorption on the clamping cone remains constant and is thus protected from overload. The present coupling can therefore withstand significantly higher overall load levels than couplings with conventional DIN rings, i.e., the coupling of the present preferred embodiment transmits torque that exceeds the previous torque limit.

While cone pre-stress (14, 18) also occurs on a coupling (10) without load, transmission takes place on the mated end face butt joint (16, 22) and on the drive keys with increasing load only. In the no-load state, only frictional engagement exists (on the cone), and with increasing load, additional form fit develops gradually on the first drive key, and then with further increased load, also on the second drive key.

Figure 4B:
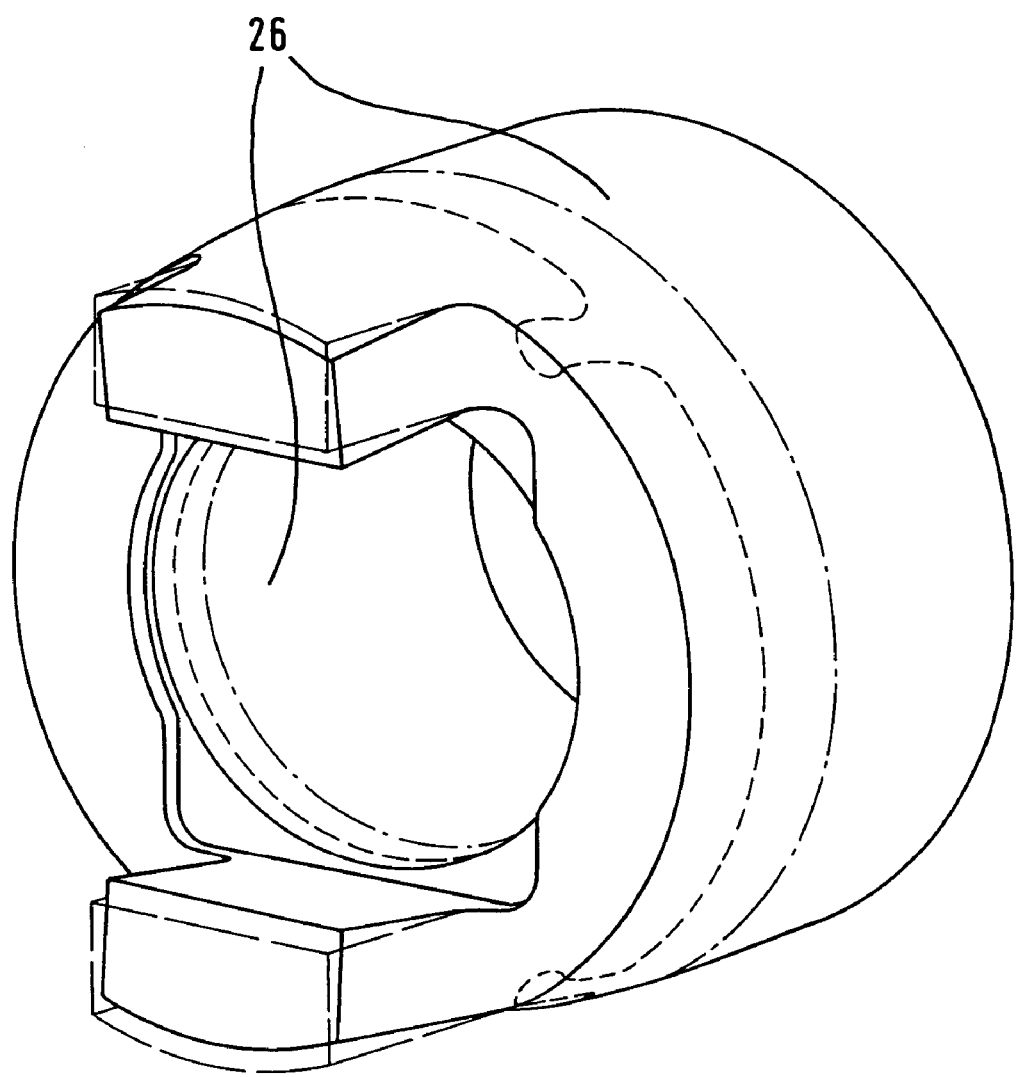
FIG. 4b is a front perspective of the female coupling part in FIG. 2 with FEM-simulated stress distribution of the shaft-hub seat stress field.
Figure 4C:
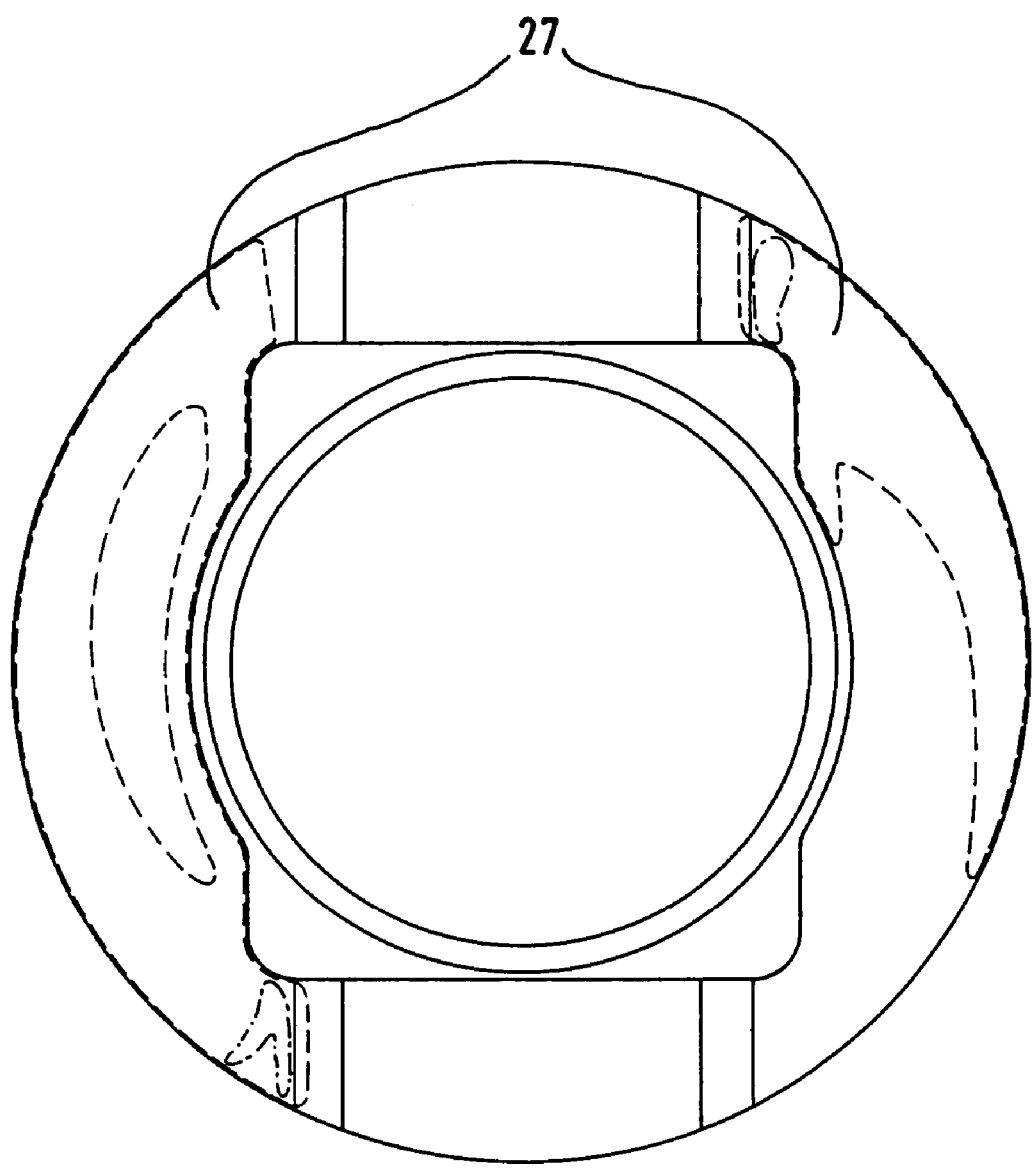
FIG. 4c is a front view of the female coupling part in FIG. 2 with FEM-simulated stress distribution of the mated end-face butt joint stress field.
Figure 4D:
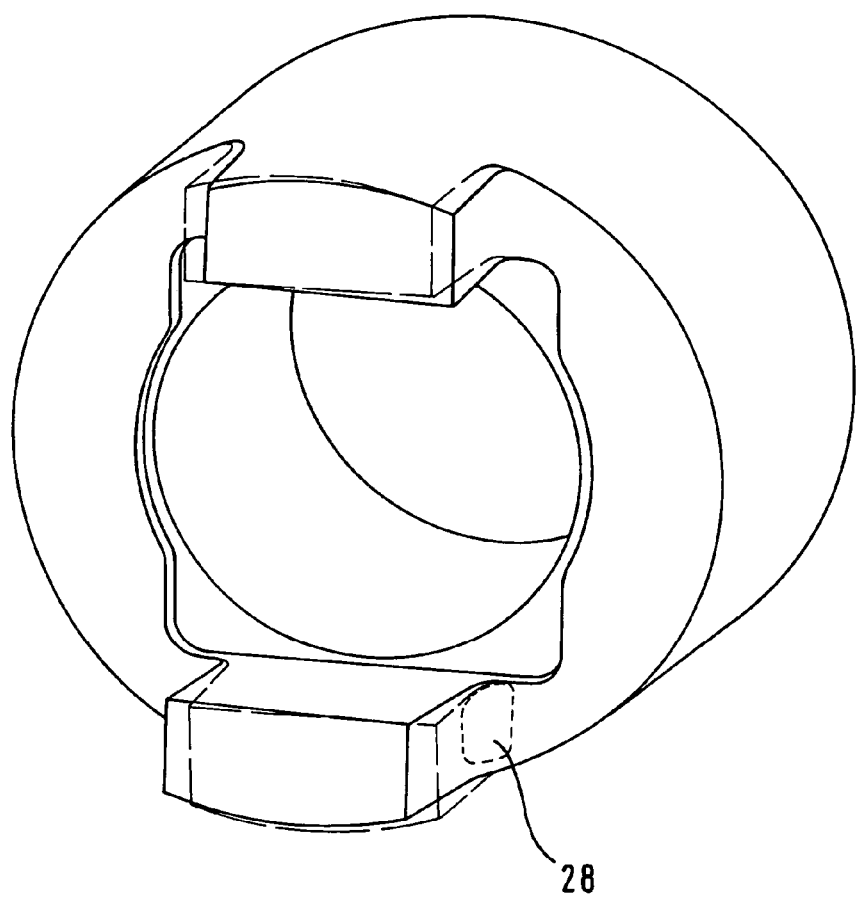
FIG. 4d is a front perspective of the female coupling part in FIG. 2 with FEM-simulated stress distribution of the stress field of a single drive key.
Figure 5A:
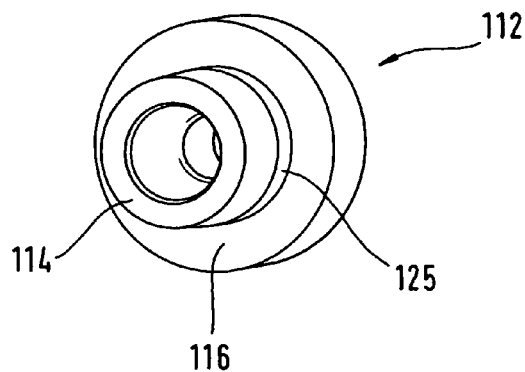
FIG. 5a is a front perspective of a male coupling part in a modified embodiment.
Figure 5B:
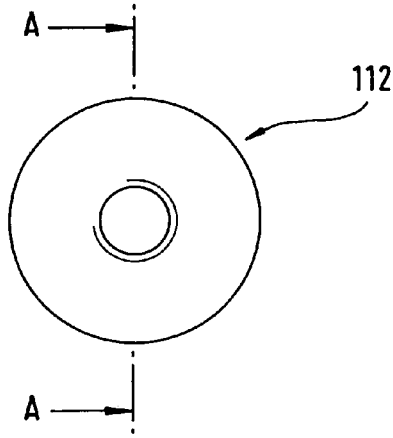
Figure 5C:
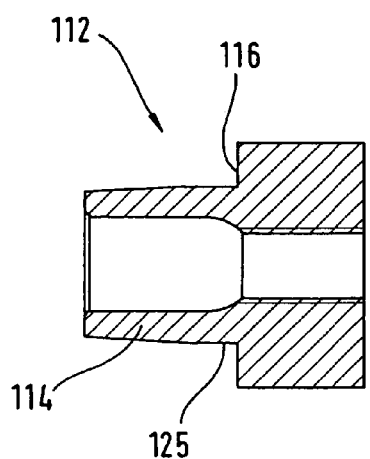
FIG. 5c is a cross-sectional side view of the coupling part in FIG. 5b, depicted along cross-sectional line A—A.
Figure 5D:
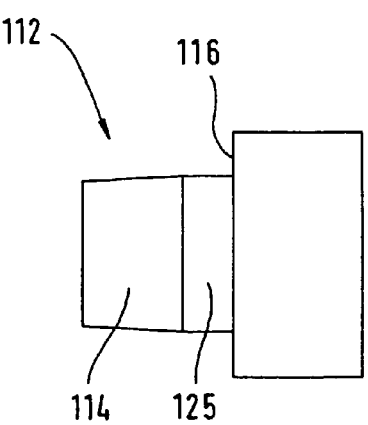
FIG. 5d is a side view of the coupling part shown in FIGS. 5a, 5b and 5c.
Figure 6A:
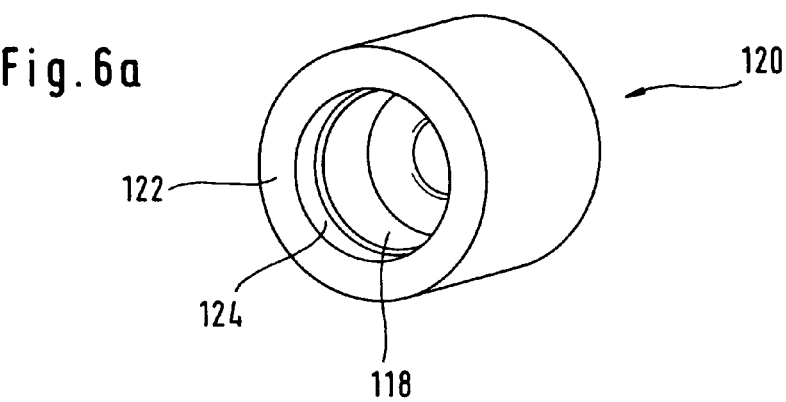
FIG. 6a is a front perspective of a female coupling part in an embodiment fitting the male coupling part shown in FIG. 5.
Figure 6C:
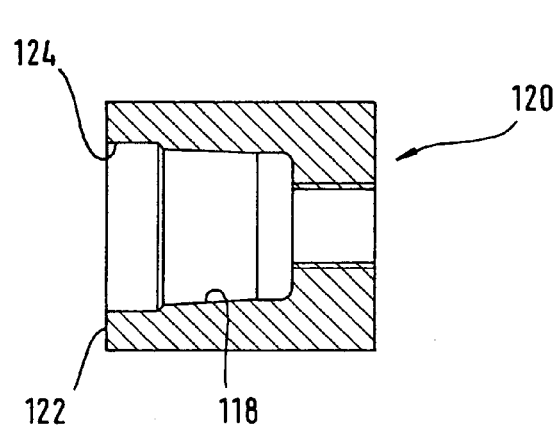
FIG. 6c is a cross-sectional side view of the coupling part in FIG. 6b, depicted along cross-sectional line A—A.
Figure 6B:
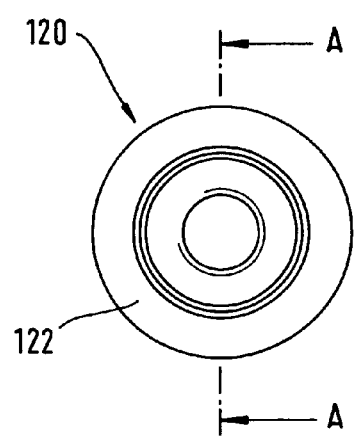
Figure 6D:
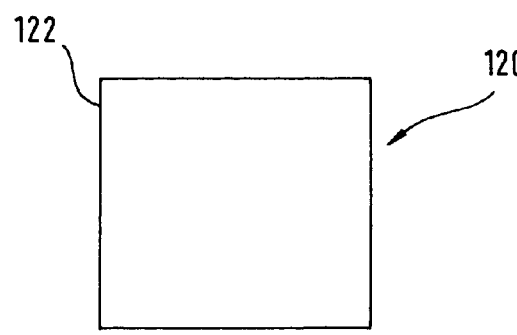
FIG. 6d is a side view of the coupling part shown in FIGS. 6a, 6b and 6c.

FIGS. 4b, 4c and 4d show the respective stress fields (26, 27, 28) on the clamping cone (14, 18) (coupling without load), face pressure (16, 22) and higher-load drive key/key way (30, 32), as calculated by simulation. Rotation direction is counter-clockwise. FIG. 4b shows a certain stress potential on the radial interior circumference, depicted as a dashed line. The chain line displays a second, higher stress potential. Stress caused by the cone press fit decreases toward the drive keys and the end face until its value drops below a limit on the dashed line. It is clearly visible that this dashed limit line runs primarily at a distance from the drive keys and the end face.

FIG. 4c shows the simulation results as to end face stress distribution. The areas of high tension (bordered and dashed areas under 27) form the stress field on the end-face butt joint. As can be seen, this stress field is located away from stress field 28 in the key way of the higher-load drive key (see FIG. 4d) on the side of the rotation direction.

Load 28 on the notch root, shown in FIG. 4d (on the nose of the drive keys), which could lead to material fatigue, is kept low and—due to axial distance—has no or only little effect on the tension distribution 26 at the cone interference (FIG. 4b). However, in FIG. 4c, strong drive-key counter-action on the face pressure in the area of the notch roots, which are not located in rotation direction, is visible (light-colored areas bordered by dash-dotted lines).

FIG. 4b also shows that the drive keys are pulled inward by radial tension on the clamping cone, since the cone expands as a result of the press connection.

Figure 7A:
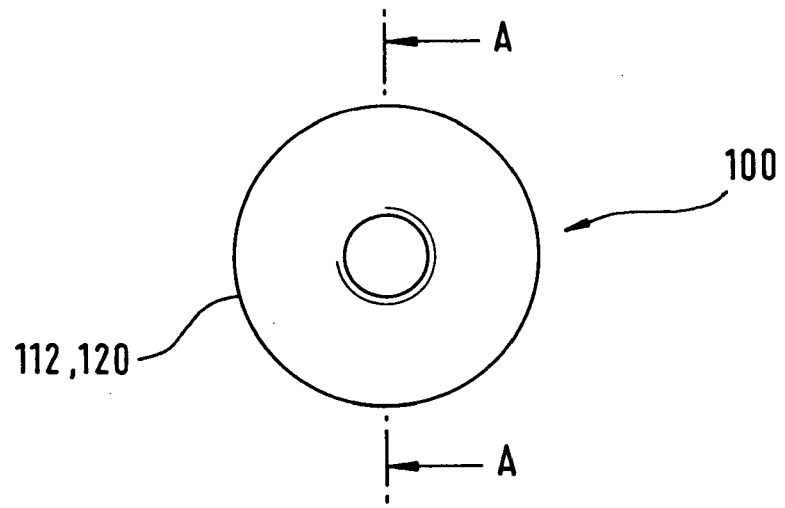
FIG. 7a is a front view of two joined coupling parts in the embodiments of FIGS. 5–6.
Figure 7B:
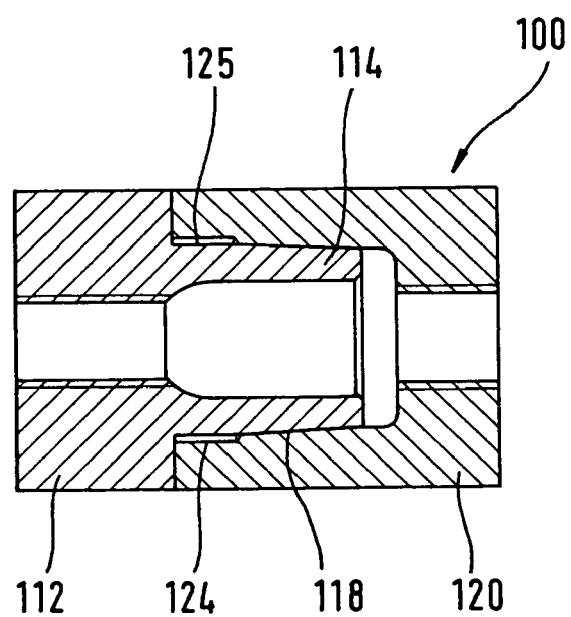
FIG. 7b is a cross-sectional side view of the coupling in FIG. 7a, depicted along cross-sectional line A—A.
Figure 8A:
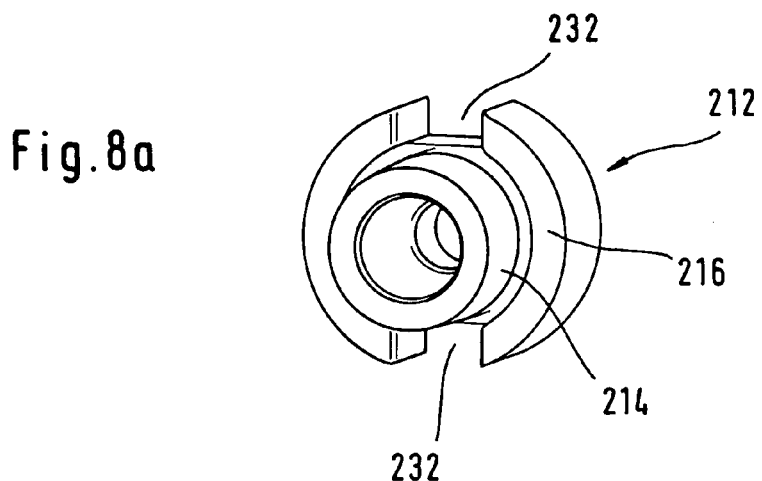
FIG. 8a is a front perspective of a male coupling part in another embodiment.
Figure 8B:
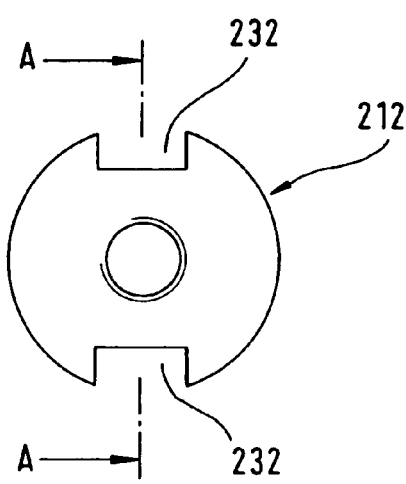
Figure 8C:
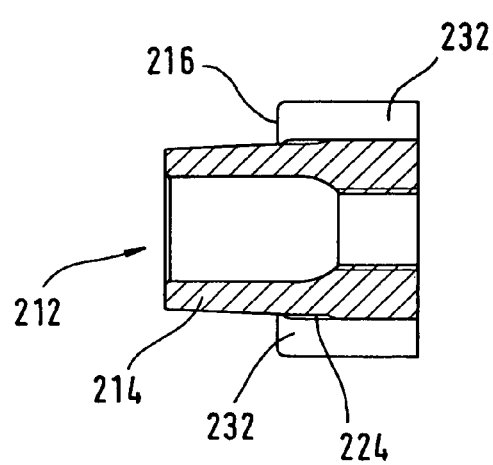
FIG. 8c is a cross-sectional side view of the coupling part in FIG. 8b, depicted along cross-sectional line A—A.
Figure 8D:
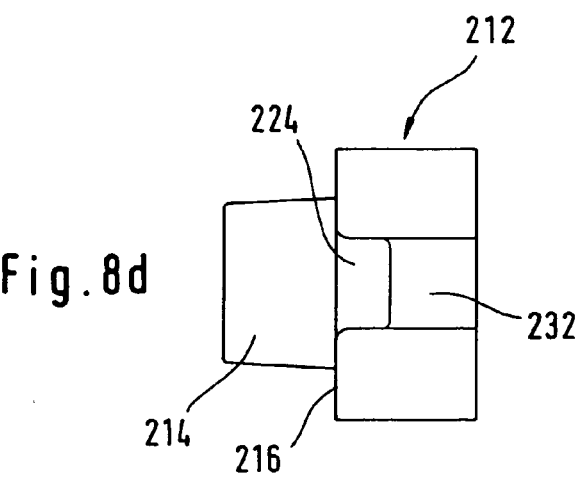
FIG. 8d is a side view of the coupling part shown in FIGS. 8a, 8b and 8c.

FIGS. 5–7 depict another preferred embodiment of the present invention, without drive keys, but solely with the two transmission locations of shaft-hub seat and mated end faces. FIGS. 5a–5d show the male coupling part (112), FIGS. 6a–6d the female coupling part (120), and FIGS. 7a–7b the coupling (100) consisting of both parts (112, 120).

The shaft-hub seat is here designed as a clamping cone (114) with sleeve (118). A cavity (124) is located between end face (122) and interior cone of the sleeve (118), (FIGS. 6), between end face (116) and cone journal (114) there is a corresponding recess (125), (FIGS. 5). Due to the recess (124, 125) of the shaft-hub seat, the assembled coupling (100) shows a separation or de-coupling of the transmission location on the clamping cone (114) in the seat (118) and on the mated end faces (114, 118). Here, an axial bore is also provided, allowing a screw to be guided for pre-stressing the cone seat.

FIGS. 8–10 show a modified embodiment of the invention. The male coupling component (212) is shown in FIGS.

Figure 10A:
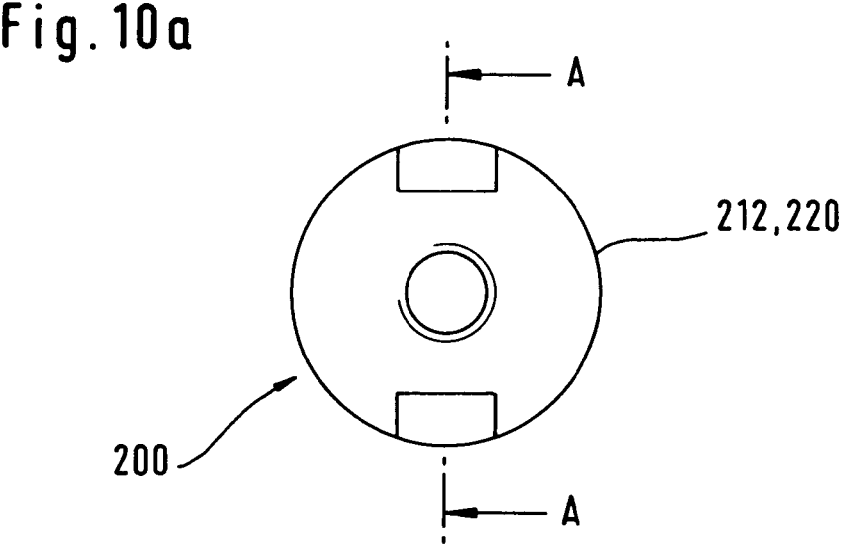
FIG. 10a is a front view of two joined coupling parts in the embodiments of FIGS. 8 and 9.
Figure 10B:
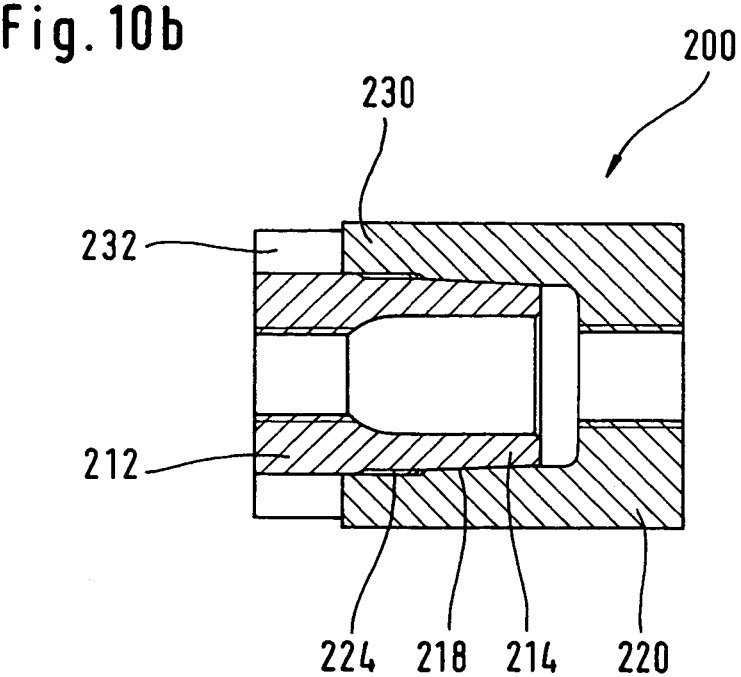
FIG. 10b is a cross-sectional side view of the coupling in FIG. 10a, depicted along cross-sectional line A—A.

8a–8d, the female coupling component (220) in FIGS. 9a–9d, and the assembled coupling (200) in FIGS. 10a–10b.

The female component (220) contains a conical seat (218) for the journal (214) of the male component (212). The seat directly joins an end face (222), which, in the assembled coupling, rests against the opposite end face (216) (see FIGS. 8a, 8b). Two drive keys (230) protrude from the end face (222) of the female coupling component (220). On the opposite side, two drive key ways (232) are provided accordingly on the male coupling component (212).

Contrary to the embodiments described so far, the present modified embodiment does not provide separation of the transmission locations of clamping cone and butt joint by a seat recess, but by surface puncture or undercut (224), (see FIGS. 8c, 8d and 10b), separating the journal (214) from the end face (16) on the male component. The undercut (224) separates a circular material section from the central journal (216) across a certain axial length. With an assembled coupling (200) the journal can thus twist freely under load across the entire length of the undercut (224) without warpage on the mated end faces (216, 222).

Additionally, the female coupling part contains a milled area (234) (FIG. 9b, 9c), shifting the notch root of the drive keys (30) beneath their interior radial surface from the end face plane (222) further into the seat (218), thereby separating the transmission locations of drive keys (230) and clamping cone (218) from each other. On the radial side surfaces of the drive keys (230) there is a rounded-off material transition area (37) (FIG. 9d). On the opposite side, the drive-key ways (232) contain correspondingly rounded sections (see FIG. 8d). This reduces the notch effect of the drive keys. Thus, the transmission locations of drive keys/hollow shaft cone are separated.

The journal (212) in the seat (218) can twist freely in the area of the undercut (224). Additionally, the radial inward notch root of the drive keys (230) is shifted out of the end face plane (222), and is at a distance from the seat (218) circumference. Thus, de-coupling of the transmission locations exists here also, so that the occurring stress fields will not, or will just slightly, superimpose.

Figure 11:
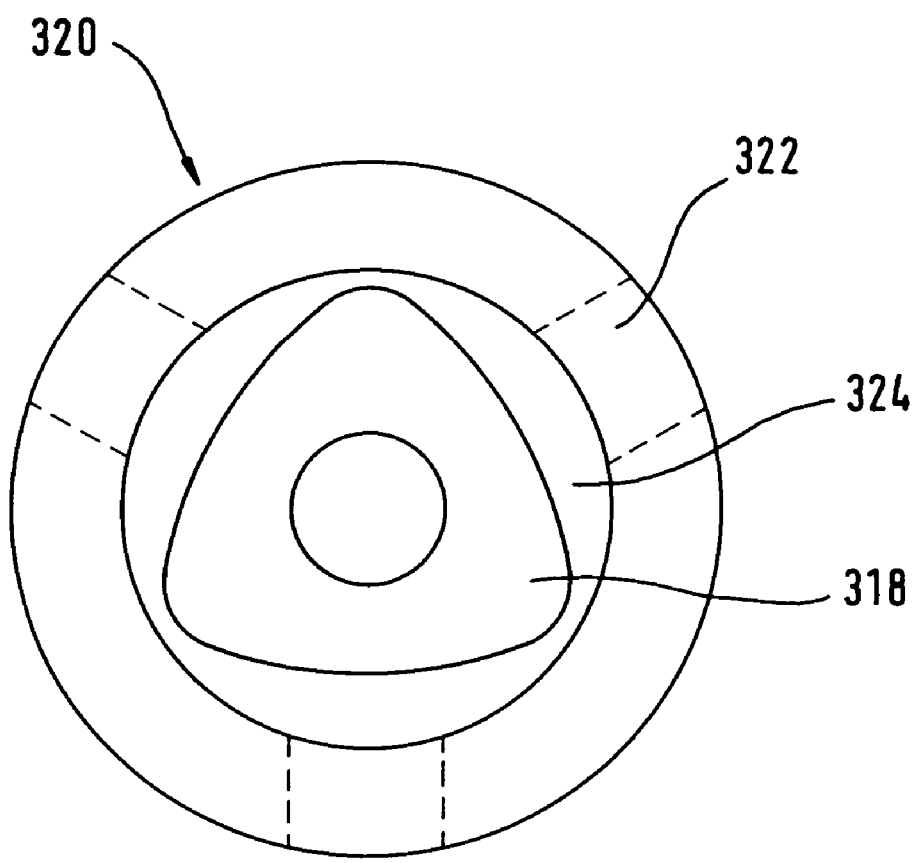
FIG. 11 is a front view of another female coupling part embodiment with a polygonal profile socket.

FIG. 11 shows a female coupling component (320) in another embodiment of the invention with a polygonal seat (318) for receiving a corresponding journal of a coupling counter-piece. In an area (324), the polygon seat profile is turned between the circular end face (322) and the polygonal seat (318) at a depth of between 0 to 1 times the nominal diameter. This way, in the assembled coupling, the shaft-hub seat is recessed in the end face area (322), causing the two transmission locations of polygonal shaft-hub seat and butt joint to be effectively separated on two mated end faces.

Although the seat does not contain any drive keys, an embodiment with drive keys is also conceivable, in particular in the dashed areas, where the polygon seat profile recedes the farthest from the end face radially inward, facilitating rather effective separation of the transmission locations of drive keys and shaft-hub seat. This way, the tension in the area of the rounded corners of the polygon profile, resulting from the form fit on the polygonal shaft-hub seat, is also shifted away from the drive keys, so that no superposition occurs. Smooth material transition from the inner diameter of the ring-shaped end face to the outer diameter of the polygon profile is also feasible.

Figure 12:
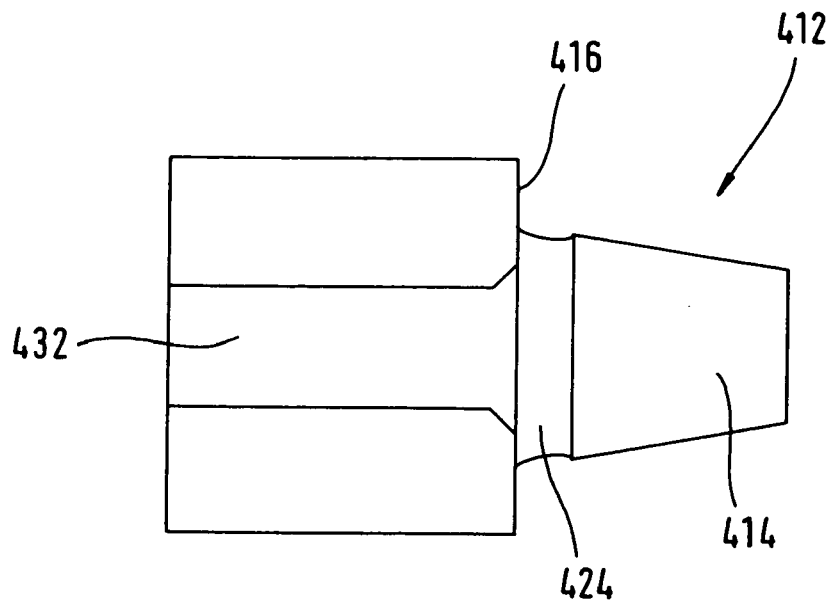
FIG. 12 is a side view of another male coupling part embodiment.
Figure 13:
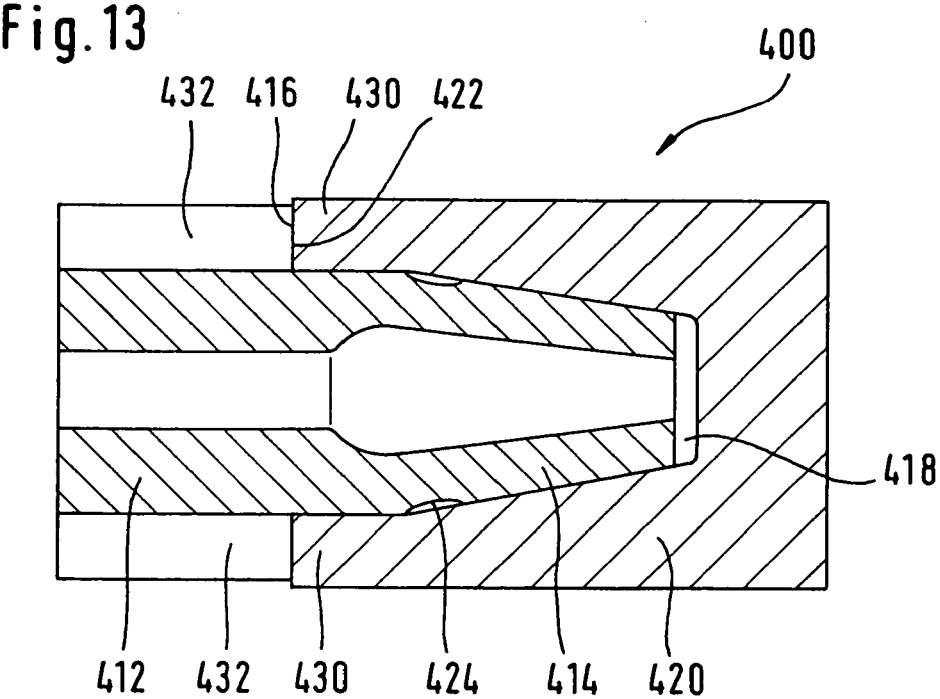
FIG. 13 is a cross-sectional side view of an assembled coupling with a male coupling part in the embodiment of FIG. 12, and a female coupling part in the embodiment of FIG. 9.

Finally, FIGS. 12 and 13 show a last embodiment of the invention. FIG. 12 shows a male coupling part with a journal (414), where a peripheral notch (424) is located between the journal (414) and an adjoining end face (416). Furthermore, a key way (432) for receiving a drive key of the coupling counter-piece has been labeled 432. FIG. 12 shows the assembled coupling of this embodiment, wherein a seat (418) is provided that corresponds to the cone journal (414) and is bordered by an end face (422). Drive keys (432) protrude from the end face (422) forming three transmission locations: clamping cone (414), end-face butt joint (416, 422) and positive fit of the drive keys (430) in the provided grooves (432). Due to the peripheral notch (424), the shaft-hub seat on the clamping cone is recessed in the area of the end faces (416, 422). This separates the transmission location of the clamping cone from the other two transmission locations. End face warpage and uneven cone expansion is prevented and the drive keys are pulled inward, due to the radial clamping cone expansion.

Of course, deviations from the variations shown are possible without leaving the basic idea of the invention. In particular, the following modifications are feasible:

Use of a random number of drive keys;

Elliptic shaft-hub seat design;

Effecting pre-stress with a suitable tension device other than a differential screw, so that a central bore for such a screw is not required. The journal could, for example, be designed as a solid shaft, and radial pins that are inserted in corresponding bores could serve as a tensioning device;

Design of drive keys/drive key ways as locating pin/bore, arranged optionally on the male or the female coupling part;

Arranging the drive keys/drive key ways radially offset to the end faces, for example through appropriate protrusions;

Use of a random number of radial pins as drive keys, which—after coupling assembly are inserted from the outside in accordingly provided bores, establishing positive fit between the male and the female coupling parts;

Use of threaded bolts as drive keys, which are screwed into appropriate bores (e.g. radial pins or axial pins, running through appropriate radial material protrusions on the male and the female coupling parts);

Reduction of load in the notch root on the radial side surfaces through appropriate undercuts or milled areas in the end faces/drive key surfaces.

Thus a coupling (10; 100; 200; 400) is for use between the modules of a modular tool holder arm, in particular a machine tool, with a male coupling part (12; 112; 212; 412) which forms the end of a first module and contains a central, axially symmetrical journal (14; 114; 214; 414), and a female coupling part (20; 120; 220; 320; 420), which forms the end of a second module connecting to the first module and contains a central, axially symmetrical seat (18; 118; 218; 318; 418). In the engaged state, the two coupling parts form a shaft-hub seat (14, 18; 114, 118; 214, 218; 414, 418) as a first transmission location and at least one additional transmission location. At least under load, a first stress field (26) develops at the first transmission location and a second stress field (27; 28) at the at least one more transmission location, wherein a separation (24, 25; 124, 125; 224; 324; 424) of the first transmission location from the at least one other transmission location is provided, and the respective stress field (26; 27; 28) is formed without being influenced by the other transmission location(s).

What is claimed is:

1. A coupling for use between the modules of a modular tool holder arm, comprising:

a male coupling part forming the end of a first module and containing a central, hollow journal having a symmetrical cross section, which journal is bordered on one end thereof by a first end face perpendicular to its perimeter surface, and a female coupling part forming the end of a second module connected to the first module and containing a central, hollow seat having a symmetrical cross section, which is bordered on an end of the second module by a second end face perpendicular to its perimeter surface, wherein in an engaged state of the coupling, the male and female coupling parts form a shaft-hub seat as a first power transmission location and the first and second end faces resting against each other by frictional engagement form a second power transmission location, wherein at least under load during rotation of the coupling about a rotational axis thereof, a first stress field develops at the first power transmission location, and a second stress field develops at the second power transmission location, and wherein the first power transmission location is separated from the second power transmission location, so that each of said stress fields is influenced only by the power transmission location forming the respective stress field, wherein drive keys form a third power transmission location, wherein at least under load, a third stress field forms in the third power transmission location, and wherein the second and the third power transmission locations are separated from each other so that each of said stress fields is influenced only by the power transmission location forming the respective stress field.

2. The coupling according to claim 1, wherein the shaft-hub seat comprises a conical shape according to specifications of an HSK system.

3. The coupling according to claim 1, wherein the shaft-hub seat comprises a polygon shape.

4. The coupling according to claim 1, wherein the separation of the first transmission location and the second transmission location is provided by spacing of the shaft-hub seat from the end faces in a direction of the axis of rotation of the coupling.

5. The coupling according to claim 4, wherein the axial spacing is provided by a recess of the shaft-hub seat in the area of the end faces.

6. The coupling according to claim 5, wherein the recess of the shaft-hub seat in the area of the end faces is provided by a recess in the central, hollow seat.

7. The coupling according to claim 6, wherein drive keys are provided off-center on one of the coupling parts, and recesses are provided for the drive keys on the other coupling part, wherein, in the engaged state of the coupling, the drive keys mesh with the recesses, forming at least one additional transmission location.

8. The coupling according to claim 7, wherein the drive keys are provided as one piece with one of the two coupling parts.

9. The coupling according to one of claims 7 and 8, wherein the drive keys are axially distanced from the shaft-hub seat in the direction of the rotational axis.

10. The coupling according to claim 8, wherein the drive keys are provided on the female coupling part.

11. A system including the coupling according to claim 1, including a tool insert holder for a tool holder arm of a machine tool, with one of the two coupling parts, for insertion into a corresponding receiving piece, containing the appropriate other coupling part.

12. A system including the coupling according to claim 1, including an extension or adapter for a tool holder arm of a machine tool containing one of the two coupling parts, at least on one side.

13. A system including the coupling according to claim 1, including a basic adapter for a tool holder arm of a machine tool with one of the two coupling parts for receiving one of a tool insert piece and an extension or adapter.

* * * * *